United States Patent [19]
Calderon et al.

[11] Patent Number: 5,652,304
[45] Date of Patent: Jul. 29, 1997

[54] VAPOR PHASE SYNTHESIS OF RUBBERY POLYMERS

[75] Inventors: Nissim Calderon, Akron; Kenneth Floyd Castner, Uniontown; Howard Allen Colvin, Tallmadge; Joel Muse, Jr., Hudson, all of Ohio

[73] Assignee: The Goodyear Tire & Rubber Company, Akron, Ohio

[21] Appl. No.: 663,803

[22] Filed: Jun. 28, 1996

Related U.S. Application Data

[60] Provisional application No. 60/003,089, Aug. 31, 1995, and provisional application No. 60/005,781, Oct. 20, 1995.

[51] Int. Cl.$^6$ .............. C08F 2/34; C08F 136/06; C08F 136/08
[52] U.S. Cl. .............. 526/142; 526/88; 526/129; 526/137; 526/141; 526/159; 526/168; 526/169.1; 526/901; 526/340.2; 526/340.4; 526/903; 524/722; 524/741; 524/856
[58] Field of Search .............. 526/129, 137, 526/141, 142, 159, 901, 340.2, 340.4, 903, 88, 168, 169.1; 524/722, 741, 856

[56] References Cited

U.S. PATENT DOCUMENTS

| | | | |
|---|---|---|---|
| 3,047,559 | 7/1962 | Mayor et al. | 526/159 |
| 3,386,983 | 6/1968 | Witte et al. | 260/94.3 |
| 3,458,940 | 8/1969 | Irvin et al. | 260/94.2 |
| 3,770,710 | 11/1973 | Futamura et al. | 260/83.7 |
| 4,098,980 | 7/1978 | Markle et al. | 526/201 |
| 4,155,880 | 5/1979 | Throckmorton et al. | 252/429 |
| 4,452,960 | 6/1984 | Throckmorton | 526/201 |
| 4,983,695 | 1/1991 | Kuzma et al. | 526/340.4 X |
| 5,317,036 | 5/1994 | Brady, III et al. | 523/223 |
| 5,451,646 | 9/1995 | Castner | 526/137 |

FOREIGN PATENT DOCUMENTS

| | | | |
|---|---|---|---|
| 1284545 | 5/1991 | Canada | 402/444 |
| 2133526 | 4/1995 | Canada | C08F 4/52 |

*Primary Examiner*—Fred Teskin
*Attorney, Agent, or Firm*—Alvin T. Rockhill

[57] ABSTRACT

By utilizing the vapor phase polymerization techniques of the present invention, numerous distinct and highly beneficial advantages are realized. For instance, cis-1,4-polyisoprene rubber and high cis-1,4-polybutadiene rubber having a consistent and controllable molecular weight can be easily and practically prepared without utilizing a solvent. The subject invention more specifically discloses a method for vapor phase polymerizing isoprene into cis-1,4-polyisoprene in a process comprising the steps of:

(1) charging into a reaction zone said isoprene and a preformed catalyst system which is made by reacting an organoaluminum compound with titanium tetrachloride, preferably in the presence of at least one ether; wherein the isoprene is maintained in the vapor phase in said reaction zone by a suitable combination of temperature and pressure;

(2) allowing said isoprene to polymerize into cis-1,4-polyisoprene at a temperature within the range of about 35° C. to about 70° C.; and (3) withdrawing said cis-1,4-polyisoprene from said reaction zone. It has been determined that gel formation can be reduced by conducting the polymerization of isoprene monomer in the presence of a diarylamine, such as para-styrenated diphenylamine.

79 Claims, 1 Drawing Sheet

FIGURE 1

VAPOR PHASE SYNTHESIS OF RUBBERY POLYMERS

This application claims the benefit of U.S. provisional application Ser. No. 60/003,089, filed Aug. 31, 1995 and United States Provisional Application No. 60/005,781, filed Oct. 20, 1995.

BACKGROUND OF THE INVENTION

Many types of polymerization processes are used in the preparation of synthetic polymers. For example, the polymerization of a monomer into a polymer can be conducted in a number of different types of reaction systems, including suspension polymerization systems, emulsion polymerization systems, nonaqueous dispersion polymerization systems, solution polymerization systems, bulk polymerization systems and vapor phase polymerization systems. Each of these systems has certain advantages and disadvantages.

In suspension polymerization systems, the initiator (catalyst) is dissolved in the monomer, the monomer is dispersed in water and a dispersing agent is incorporated to stabilize the suspension formed. All suspension polymerization processes use some type of surfactant to keep the monomer globules dispersed during the reaction in order to avoid coalescence and agglomeration of the polymer. Not only does the suspension stabilizer affect the particle size and shape, but also the clarity, transparency and film-forming properties of the resultant polymer. A variety of dispersing agents including water-insoluble, finely divided, inorganic materials and organic materials, depending upon the monomer to be polymerized, have been used as dispersing agents. Thus, for example, talc, barium, calcium and magnesium carbonates, silicates, phosphates and sulfates, as well as poly(vinylalcohol), salts of styrene-maleic anhydride copolymers, vinyl acetate-maleic anhydride copolymers, starch, gelatin, pectin, alginates, methyl cellulose, carboxymethyl cellulose, bentonite, limestone and alumina have been used as suspending agents. A major advantage of suspension polymerization is that the polymeric products are obtained in the form of small beads which are easily filtered, washed and dried. For reasons of cost and low reactivity, water is a much more desirable diluent and heat-transfer medium than most organic solvents.

However, in certain polymerization processes, the presence of moisture is highly undesirable. For example, in the preparation of cis-1,4-polyisoprene with titanium catalyst systems, the presence of significant amounts of water cannot be tolerated. Another example of a polymerization where the presence of water is highly undesirable is the synthesis of very high cis-1,4-polybutadiene with nickel catalyst systems. Thus, suspension polymerization in a water medium is not an effective process for the synthesis of cis-1,4-polyisoprene utilizing titanium catalyst systems or for the synthesis of high cis-1,4-polybutadiene using nickel catalyst systems.

An emulsion polymerization process is considered to be a three-phase reaction system consisting of large droplets of the monomer, the aqueous phase containing the dissolved initiator and the colloidal particles of monomer-swollen polymer. While the emulsion polymerization process has the economic advantage of using water as the emulsion base, not all polymerization processes can tolerate the presence of water. Such is the case with the polymerization of isoprene into cis-1,4-polyisoprene using titanium catalyst systems and with the polymerization of 1,3-butadiene monomer into very high cis-1,4-polybutadiene using nickel catalyst systems. In order to recover dry polymers which are prepared by emulsion polymerization, it is, of course, necessary to coagulate the rubber from the latex. Coagulation is generally accomplished by adding a combination of salt and acid to the latex. This results in the formation of waste water which can present environmental problems.

In solution polymerization, an organic solvent is used which is capable of dissolving the monomer, the polymer and the polymerization catalyst or initiator. Inasmuch as the polymer is soluble in the organic solvent which is used, there is a tendency for the viscosity of the solution to increase as the molecular weight of the polymer increases. If this continues over a period of time, the solution becomes too viscous to handle in conventional polymerization reaction systems unless the solids content is limited to a low level. In commercial polymerization processes, it is desirable to obtain a polymerization mass which has a high concentration of solid polymer and, at the same time, comprises a material which is easy to handle and does not agglomerate on the walls of the reaction vessel utilized. The polymeric solution is generally steam-stripped in order to remove the solvent and unreacted monomer. The aqueous slurry of crumb rubber is usually pumped to a skimming tank, a water expeller and an extruder dryer in order to remove the water. The steam-stripping and drying operations consume a large amount of expensive energy.

The solution polymerization of isoprene monomer into cis-1,4-polyisoprene rubber with a preformed titanium catalyst system is described in U.S. Pat. No. 3,386,983. The solution polymerization of 1,3-butadiene monomer into high cis-1,4-polybutadiene rubber with a catalyst system consisting of (1) an organoaluminum compound, (2) an organonickel compound and (3) a hydrogen fluoride complex is described in U.S. Pat. No. 4,155,880.

In nonaqueous dispersion polymerizations, an organic medium is utilized which is a very poor solvent for the polymer being produced. A dispersing agent is utilized in the organic medium in order to disperse the polymer being formed throughout the medium. The dispersing agents (dispersion stabilizers) which are utilized in such nonaqueous dispersion polymerizations are generally polymeric materials which can be block copolymers, random copolymers or homopolymers. Nonaqueous dispersion polymerizations are described in detail in U.S. Pat. No. 4,098,980 and U.S. Pat. No. 4,452,960. Nonaqueous dispersion polymerization processes offer several distinct advantages over solution polymerizations and emulsion polymerizations including improved heat transfer, higher polymer concentrations in the reaction medium, increased production capacity and energy savings.

Bulk polymerization is the direct conversion of liquid monomers to polymer. Such bulk polymerizations are generally carried out by the addition of an initiator to a simple homogeneous system containing one or more monomers. The polymers produced in such bulk polymerizations can be, but are not necessarily, soluble in their own monomers which are in effect utilized as the reaction medium. For example, polyisoprene is fairly soluble in isoprene and polypentadiene is fairly soluble in 1,3-pentadiene, but high cis-1,4-polybutadiene is not very soluble in 1,3-butadiene monomer.

The synthesis of polystyrene by the addition of a free radical initiator to styrene monomer is a good example of a very common bulk polymerization. The principal advantage of a bulk polymerization process is that no solvent is utilized. Thus, the cost of solvent recovery and recycle is eliminated. One disadvantage of bulk polymerization reactions is that it is difficult to control the reaction temperature during polymerization. In fact, attempts to bulk polymerize many types of monomers have resulted in uncontrolled reaction. Due to this difficulty, bulk polymerization has not been widely utilized in the commercial preparation of synthetic rubbers.

Bulk polymerization eliminates the need for utilizing solvents which must be separated from rubber and recycled or otherwise disposed of. The cost of recovery and recycle of solvent adds greatly to the cost of the rubber being produced and can cause certain environmental problems. Recovery and separation of the rubber from the solvent also requires additional treatment and equipment, all of which further increase the cost of the rubber. The purification of solvents being recycled can also be very expensive and there is always the danger that the solvent may still retain impurities which will poison the polymerization catalyst.

The concept of preparing synthetic rubbers by bulk polymerization is not new. It has been known for many years that diene monomers can be polymerized into synthetic rubbers in the absence of a solvent. In fact, the Germans and Russians synthesized polybutadiene and polydimethylbutadiene in bulk during World War I using alkali metal catalysts in a batch process. Polybutadiene has also been prepared by the addition of catalysts to small polymerization bottles containing butadiene monomer. Due to the highly exothermic nature of such bulk polymerizations, it is not at all uncommon for the polymerization bottles being utilized in these small scale bulk polymerizations to explode. Because such bulk polymerization reactions are essentially uncontrollable, polymer uniformity is very poor, gel formation is frequently a problem and molecular weight control is very difficult. For these reasons, the bulk polymerization of isoprene monomer into cis-1,4-polyisoprene has not been widely considered to be commercially feasible.

It has been proposed to control bulk polymerizations by employing a device for cooling the reaction zone by controlled evaporation of and removal of a portion of the liquid reactant from the reaction zone. This technique is sometimes referred to as autorefrigeration. A description of bulk polymerization which employs autorefrigeration appears in U.S. Pat. No. 3,458,490. In a technique disclosed therein, a solution of polybutadiene in butadiene monomer was prepared in a solution polymerization type of reactor which was spirally agitated. However, only 35 percent of the butadiene monomer charged was converted to polymer. Steam-stripping was employed to remove unreacted monomer from the polybutadiene product formed.

Another bulk polymerization process that utilizes autorefrigeration to control foaming is described in U.S. Pat. No. 3,770,710. In a technique disclosed therein, a process was utilized which comprised initially preparing at a polymerization temperature which was not substantially in excess of about 50° C., a polymer-monomer solution having a solids content of only 20 to 40 percent and continuing the polymerization of said polymer-monomer solution in a subsequent reactor at a temperature in the range of 50° C. to 150° C. A lithium containing catalyst is utilized in the process described therein with the Mooney viscosity of the resulting polymer increasing with polymerization time.

Canadian Patent 1,284,545 discloses a method for bulk polymerizing 1,3-butadiene into high cis-1,4-polybutadiene in a continuous process which comprises:

(1) charging said 1,3-butadiene; a catalyst system comprising (a) an organoaluminum compound, (b) a soluble nickel containing compound and (c) a fluorine containing compound; into a reaction zone;

(2) allowing said 1,3-butadiene to polymerize into high cis-1,4-polybutadiene to a conversion of at least about 60 percent while utilizing conditions under which there is sufficient evaporative cooling in said reaction zone to maintain a temperature within the range of 10° C. to 130° C.; and (3) continuously withdrawing said high cis-1,4-polybutadiene from said reaction zone.

Canadian Patent Application 2,133,526 discloses a catalyst system and technique for the gas-phase polymerization of conjugated diene monomers, such as 1,3-butadiene monomer, into polymers. However, this Canadian patent does not disclose any polymerizations of isoprene into polyisoprene. The catalyst systems disclosed by Canadian Patent Application 2,133,526 consist of (a) a rare earth metal component, (b) an organoaluminum compound, (c) a Lewis acid component and (d) an inert particulate inorganic solid. This gas phase process is reported to offer environmental advantages attributable to the fact that no solvents are used, with emissions and waste water pollution accordingly being reduced. U.S. Pat. No. 5,317,036 discloses a process and equipment for the gaseous phase polymerization of olefin monomers into polymers with unsupported soluble transition metal coordination catalysts.

SUMMARY OF THE INVENTION

By utilizing the vapor phase polymerization process of the present invention, numerous distinct and highly beneficial advantages are realized. For instance, high cis-1,4-polyisoprene rubber having relatively high molecular weights can be easily and practically prepared without utilizing a solvent. High cis-1,4-polybutadiene rubber having relatively uniform or consistent and controllable molecular weights can also be easily and practically prepared without utilizing a solvent. It is possible to make high cis-1,4-polybutadiene for specific applications requiring distinctly different molecular weights by simply modifying the process to attain the molecular weight desired without limiting conversions.

Since the vapor phase polymerization technique of this invention does not require a solvent, the need for a solvent removal step is eliminated. The need to purchase and handle solvents is, of course, also eliminated which reduces the cost of the overall process.

In light of the fact that high conversions can be attained, the amount of volatile organic compounds, such as monomer, in the rubber produced is minimal. This is, of course, because the reaction medium used is solventless. In any case, the gas phase polymerization process of this invention offers environmental advantages attributable to the fact that no solvents are used with emissions and waste water pollution accordingly being reduced.

It has been unexpectedly found that diarylamine antioxidants, such as para-styrenated diphenylamine, do not interfere with the vapor phase polymerizations of this invention. It has also been unexpectedly found that hindered phenol antioxidants do not interfere with the vapor state polymerization of 1,3 -butadiene monomer into cis-1,4-polybutadiene rubber. This accordingly allows for such polymerizations to be conducted in the presence of these types of antioxidants. The antioxidant can be premixed with the catalyst, it can be premixed with a partitioning agent, or it can be added to the reaction zone as a separate component.

The presence of such antioxidants during the vapor phase polymerization proves to be highly beneficial because the rubbery polymer being synthesized is provided with improved stability during the high temperatures experienced during the finishing and storage of vapor phase polymerized rubber. The problem of oxidative degradation is particularly acute in vapor phase polymerized diene rubber because the rubbery polymer is generally in a finely dispersed form which makes it more susceptible to degradation. The antioxidant, of course, subsequently remains in the rubber and continues to provide it with a higher level of stability against oxidative degradation throughout its service life.

The presence of diarylamines, such as para-styrenated diphenylamine, during the polymerization of isoprene monomer into polyisoprene has also been unexpectedly found to reduce gel formation. This ability to reduce gel formation often proves to be highly beneficial. Conducting the nickel catalyzed vapor phase polymerization of 1,3-butadiene monomer in the presence of diarylamines also reduces the molecular weight of the high cis-1,4-polybutadiene rubber produced. Thus, the molecular weight of the high cis-1,4-polybutadiene rubber produced can be controlled by conducting such polymerizations in the presence of a specific amount of diarylamine. In other words, the molecular weight of the rubber synthesized can be reduced slightly by conducting the polymerization in the presence of a small amount of diarylamine or it can be reduced greatly by conducting the polymerization in the presence of a relatively large amount of diarylamine.

The present invention more specifically discloses a method for vapor phase polymerization of isoprene into cis-1,4-polyisoprene in a process comprising the steps of:

(1) charging into a reaction zone said isoprene and a preformed catalyst system which is made by reacting an organoaluminum compound with titanium tetrachloride in the presence of at least one ether; wherein the isoprene is maintained in the vapor phase in said reaction zone by a suitable combination of temperature and pressure;

(2) allowing said isoprene to polymerize into cis-1,4-polyisoprene at a temperature within the range of about 35° C. to about 70° C.; and (3) withdrawing said cis-1,4-polyisoprene from said reaction zone.

The subject invention further discloses a method for vapor phase polymerizing isoprene into cis-1,4-polyisoprene in a process comprising the steps of:

(1) charging into a reaction zone said isoprene and a preformed catalyst system which is made by reacting an organoaluminum compound with titanium tetrachloride; wherein the isoprene is maintained in the vapor phase in said reaction zone by a suitable combination of temperature and pressure;

(2) allowing said isoprene to polymerize into cis-1,4-polyisoprene at a temperature within the range of about 0° C. to about 100° C.; and (3) withdrawing said cis-1,4-polyisoprene from said reaction zone.

The present invention also reveals a method for vapor phase polymerizing 1,3-butadiene into high cis- 1,4-polybutadiene in a process comprising the steps of:

(1) charging said 1,3-butadiene and a catalyst system comprising (a) an organoaluminum compound, (b) a nickel containing compound and (c) hydrogen fluoride or a hydrogen fluoride complex into a reaction zone; wherein the 1,3-butadiene is maintained in the vapor phase in said reaction zone by a suitable combination of temperature and pressure;

(2) allowing said 1,3-butadiene to polymerize into high cis-1,4-polybutadiene at a temperature within the range of 10° C. to 130° C.; and (3) withdrawing said high cis-1,4-polybutadiene from said reaction zone.

The present invention further discloses a method for vapor phase polymerizing a conjugated diolefin monomer into a rubbery polymer in a process which comprises the steps of:

(1) charging said conjugated diolefin monomer, a catalyst and a diarylamine antioxidant into a reaction zone; wherein the conjugated diolefin monomer is maintained in the vapor phase in said reaction zone by a suitable combination of temperature and pressure;

(2) allowing said conjugated diolefin monomer to polymerize in said reaction zone into a rubbery polymer; and (3) withdrawing said rubbery polymer from said reaction zone.

DETAILED DESCRIPTION OF THE INVENTION

In the vapor phase polymerizations of this invention, the reaction zone is constructed in such a way so as to provide constant agitation to its contents. It will also be constructed in a manner that will provide a means for sufficient cooling to maintain the desired temperature within the reaction zone (from about 0° C. to about 100° C. in cases where isoprene is being polymerized and from about 10° C. to about 130° C. in cases where 1,3-butadiene is being polymerized). Finally, a means for transporting the rubbery polymer, such as cis-1,4-polyisoprene or high cis-1,4-polybutadiene, from the reaction zone will be included in the design of the reaction zone.

Gas phase polymerization reactions may be carried out in fluidized bed reactors, stirred reactors or paddle-type reaction systems. While the following discussion will feature fluidized bed systems, it is to be understood that the general concepts relating to vapor phase polymerization are also applicable to the stirred or paddle-type reaction systems as well. The present invention is not limited to any specific type of gas phase reaction system.

In very general terms, a conventional fluidized bed process for producing rubbery polymers is conducted by passing a gaseous stream containing one or more monomers continuously through a fluidized bed reactor under reactive conditions and in the presence of catalyst at a velocity sufficient to maintain the bed of solid particles in a suspended condition. The gaseous stream containing unreacted gaseous monomer is withdrawn from the reactor continuously, compressed, cooled and recycled into the reactor. Rubbery product is withdrawn from the reactor and make-up monomer is added to the recycle stream.

Figure 1:
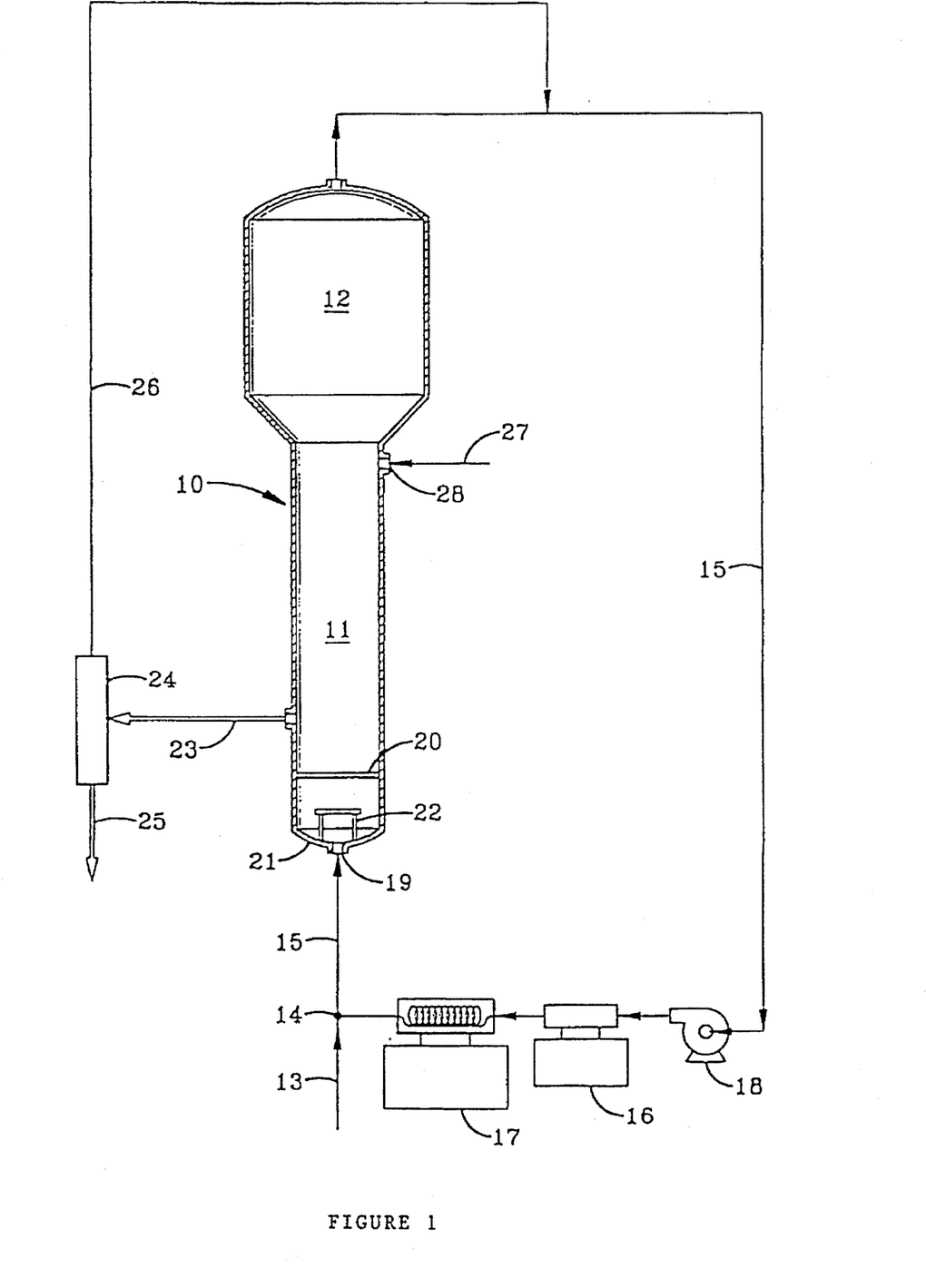
FIG. 1 is a schematic illustration of a preferred embodiment of the present invention showing equipment which can be utilized in a continuous, vapor phase, fluidized bed polymerization of conjugated diolefin monomers, such as isoprene and 1,3-butadiene, into rubbery polymers, such as cis-1,4-polyisoprene rubber and high cis-1,4-polybutadiene rubber.

A basic, conventional fluidized bed system is illustrated in FIG. 1. The reactor 10 comprises a reaction zone 11 and a velocity reduction zone 12. While a reactor configuration comprising a generally cylindrical region encompassing the fluidized bed beneath an expanded section is shown in FIG. 1, alternative configurations such as a reactor configuration comprising an entirely or partially tapered reactor may also be utilized. In such configurations, the fluidized bed is located within a tapered reaction zone but below a region of greater cross-sectional area which serves as the velocity reduction zone of the more conventional reactor configuration shown in FIG. 1.

In general, the height to diameter ratio of the reaction zone can vary in the range of about 2.7:1 to about 5:1. The range may vary to larger or smaller ratios and depends upon the desired production capacity. The cross-sectional area of the velocity reduction zone 12 is typically within the range of from about 2.5 to about 2.9 multiplied by the cross-sectional area of the reaction zone 11.

The reaction zone 11 includes a bed of growing polymer particles, formed polymer particles and a minor amount of catalyst, all fluidized by the continuous flow of polymerizable and modifying gaseous components, including inert gases, in the form of make-up feed and recycle fluid through the reaction zone. To maintain a viable fluidized bed, the superficial gas velocity through the bed must exceed the minimum flow required for fluidization which is typically from about 0.2 to about 0.5 ft/sec (about 6.1 cm/sec to about 15.2 cm/sec). Preferably, the superficial gas velocity is at least 0.2 ft/sec (6.1 cm/sec) above the minimum flow for fluidization or from about 0.4 ft/sec to about 0.7 ft/sec (12.2 cm/sec to 21.3 cm/sec). Ordinarily, the superficial gas velocity will not exceed 5.0 ft/sec (152.4 cm/sec) and is usually no more than about 2.5 ft/sec (76.2 cm/sec).

On start-up, the reactor is generally charged with a bed of particulate polymer particles before gas flow is initiated. Such particles help to prevent the formation of localized "hot spots" when catalyst feed is initiated. They may be the same as the polymer to be formed or different. When different, they are withdrawn with the desired newly formed polymer particles as the first product. Eventually, a fluidized bed consisting of desired polymer particles supplants the start-up bed.

Fluidization is achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area.

Make-up gases from make-up line 13 are fed at point 14 into recycle line 15. The make-up gases include monomers and inert gases. Inert gases, such as nitrogen, can be included to moderate the rate of polymerization if desired. The composition of the recycle stream is typically measured by a gas analyzer 16 and the composition and amount of the make-up stream is then adjusted accordingly to maintain an essentially steady state gaseous composition within the reaction zone. The gas analyzer 16 can be positioned to receive gas from a point between the velocity reduction zone 12 and heat exchanger 17, preferably, between compressor 18 and heat exchanger 17.

To ensure complete fluidization, the recycle stream and, where desired, at least part of the makeup stream are returned through recycle line 15 to the reactor at point 19 below the bed. Preferably, there is a gas distributor plate 20 above the point of return to aid in fluidizing the bed uniformly and to support the solid particles prior to start-up or when the system is shut down. The stream passing upwardly through and out of the bed removes the heat of reaction generated by the exothermic polymerization reaction.

The portion of the gaseous stream flowing through the fluidized bed which did not react in the bed becomes the recycle stream which leaves the reaction zone 11 and passes into the velocity reduction zone 12 above the bed where a major portion of the entrained particles drop back onto the bed thereby reducing solid particle carryover.

The recycle stream is then compressed in compressor 18 and passed through heat exchanger 17 where the heat of reaction is removed from the recycle stream before it is returned to the bed. The recycle stream exiting the heat exchange zone is then returned to the reactor at its base 21 and thence to the fluidized bed through gas distributor plate 20. A fluid flow deflector 22 is preferably installed at the inlet to the reactor to prevent contained polymer particles from settling out and agglomerating into a solid mass and to maintain entrained or to re-entrain any particles or liquid which may settle out or become disentrained.

Particle polymer product is discharged via line 23. Residual monomer is removed from the rubbery polymer product by monomer separator 24. Polymer product is removed via product line 25 and monomer returned to recycle line 15 via monomer recovery line 26.

In the embodiment illustrated in FIG. 1, the supported catalyst is mixed prior to its introduction into the reaction zone. The supported, preformed catalyst system is introduced into the reaction zone 11 by feeding the catalyst into the reactor via catalyst feed line 27 at point 28 which is in the upper portion of the reaction zone.

Injection of the supported catalyst into the reactor is preferably carried out in the upper portion of the fluidized bed reaction zone 11 to provide uniform distribution. Catalyst carryover into the recycle line 15 is not normally a significant problem even in cases where the supported catalyst is injected into the upper portion of the reaction zone. It is important to minimize catalyst carryover into the recycle line because polymerization may begin and plugging of the recycle line and heat exchanger may eventually occur. Carryover of catalyst into the recycle line can result in polymerization occurring outside the reactor reaction zone which can cause plugging of the recycle line and fouling in the heat exchanger. However, if desired, the catalyst may be introduced into the reaction zone entirely above the fluidized bed at a point in the reactor which is still low enough so as to minimize any catalyst carryover into the recycle line taking into account the cross-sectional area of the reactor at the point of catalyst injection, the velocity of the gaseous stream passing through the fluidized bed, the entry point into the reactor for the catalyst and the size of the particulate support used for the catalyst.

Under a given set of operating conditions, the fluidized bed is maintained at essentially a constant height by withdrawing a portion of the bed as product at a rate essentially equivalent to the rate of formation of the particulate polymer product. As has been pointed out, the temperature within the reaction zone is regulated to be within a desired range by the heat exchanger 17.

As the rubbery polymer is exiting the reaction zone via product line 25, it can be desirable to add shortstops, antidegradants and/or other conventional rubber chemicals to it in the discharge zone. It is normally preferred to add the antidegradant directly to reaction zone 11. Mixing such rubber chemicals into the rubbery polymer can be facilitated by first dissolving them in a processing oil or mineral oil if an oil extended rubber is being prepared. Triisopropanol amine is soluble in processing oils or mineral oils and functions as a shortstop. In cases where tread rubber is being prepared, from about 1 to about 10 weight percent of the processing oil can be mixed into the rubbery polymer. In any case, an adequate amount of extending oil can be added to facilitate the process of distributing the desired rubber chemicals throughout the rubbery polymer.

After the polymer has exited the reaction zone, it may be necessary to devolatilize it in a monomer separator 24. This can normally be accomplished by repetitively subjecting the rubbery polymer to elevated temperatures and reduced pressures. This devolatilization process can be continued for as many cycles as are required to reduce the volatile materials in the rubber to acceptable levels. However, devolatilization is not required unless unacceptably high levels of residual monomer or other volatile materials are present in the rubbery polymer. Thus, in cases where monomer conversions approach 100 percent and where less than 100 ppm (parts per millon) of volatile organic compounds are present, devolatilization may not be required. However, it will normally be desirable to reduce the amount of volatile organic compounds present to less than 10 ppm.

The Vapor Phase Polymerization of Isoprene

Isoprene monomer can be polymerized to cis-1,4-polyisoprene (95 percent or more cis-1,4-isomeric isoprene units) in a continuous vapor phase polymerization process using a preformed titanium catalyst system. The cis-1,4-polyisoprene made by the process of this invention will normally have a number average molecular weight of at least 100,000 and will more typically have a number average molecular weight which is greater than 200,000.

The vapor phase polymerization of isoprene will be conducted at a temperature which is within the range of about 0° C. to about 100° C. In such vapor state polymerizations, the temperature in the reaction zone will normally be maintained within the range of about 35° C. to about 70° C. It is preferred to utilize a temperature in the reaction zone which is within the range of about 40° C. to about 60° C. The most preferred temperature for carrying out the gas phase polymerization of isoprene is about 45° C. to about 50° C.

The preformed titanium catalyst system is prepared by reacting titanium tetrachloride with an organoaluminum compound. The organoaluminum compound is preferably complexed with an ether.

The organoaluminum compound that can be utilized has the structural formula:

in which $R_1$ is selected from the group consisting of alkyl groups (including cycloalkyl), aryl groups, alkaryl groups, arylalkyl groups and hydrogen; $R_2$ and $R_3$ being selected from the group consisting of alkyl groups (including cycloalkyl), aryl groups, alkaryl groups and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride and benzyl isopropyl aluminum hydride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H).

The titanium catalyst system utilized must be preformed. Since it is preformed, the titanium catalyst system will maintain a high level of activity over a long period of time. The utilization of such a preformed catalyst system also results in the formation of a uniform polymeric product. Such preformed titanium catalyst systems are prepared in the presence of one or more ethers.

The preformed titanium catalyst can be made by a batch process. In such a batch process, the catalyst components are added sequentially to a reaction vessel. The titanium tetrachloride component is generally added to the reaction vessel first in the form of an organic solution. The aluminum component and the ether are then added to the reaction vessel to create the preformed titanium catalyst which is in the form of a slurry. The preformed titanium catalyst system can also be made by a continuous process as described in Australian Patent 582,273. The teachings of Australian Patent 582,273 are incorporated herein by reference.

In preparing the preformed catalyst system, the titanium tetrachloride and a mixture of the aluminum compound and an ether are mixed together. The titanium tetrachloride can be added as a solution of titanium tetrachloride in an inert organic solvent or it can be added neat (without being diluted in an inert organic solvent).

The term "an inert organic solvent" as used herein refers to an organic solvent which is chemically inert to all of the catalyst components utilized in the process. In other words, the inert organic solvent will not react with the titanium tetrachloride, the trialkylaluminum compound or the ether compound. Some representative examples of inert organic solvents include aromatic hydrocarbons, aliphatic hydrocarbons, alicyclic hydrocarbons and mixtures of two or more of the above-mentioned solvents. Suitable aromatic hydrocarbons for use as the inert organic solvent include benzene, toluene, xylenes, ethylbenzene, diethylbenzene, isobutylbenzene and the like. Some representative examples of suitable aliphatic hydrocarbons include n-pentane, n-hexane, isohexanes, n-heptane, n-octane, isooctanes, n-decane, 2,2-dimethylbutane, petroleum ether, kerosene, petroleum spirits, petroleum naptha and the like. Cyclohexane and methylcyclohexane are representative of alicyclic hydrocarbons that can be utilized as the inert organic solvent.

Titanium catalysts are extremely sensitive to contaminants such as oxygen, oxygen containing compounds and sulfur containing compounds and very small quantities of such contaminants can impair the activity of the catalyst. Because of this sensitivity, contaminants such as water, alcohols, aldehydes, oxides of carbon, carbonyl compounds, hydrogen sulfide, mercaptans and the like should not be present in the inert organic solvent in significant quantities. Oxygen, which is dissolved in the inert organic solvent, should be removed before the preparation of the solution of titanium tetrachloride or the solution of the trialkylaluminum compound and the ether. This can be accomplished by sparging the inert organic solvent with a noble gas or nitrogen.

The ethers that are used in the present invention generally contain from 2 to 40 carbon atoms and preferably contain from 4 to 20 carbon atoms. Some representative examples of such ethers include diethyl ether, dipropyl ether, diphenyl ether, methyl phenyl ether and the like. Diethyl ether is a good choice for use in conjunction with triethylaluminum and diphenyl ether is a good choice for use in conjunction with triisobutyl aluminum.

The titanium tetrachloride can be utilized as a solution or neat. Solutions of titanium tetrachloride can be prepared by simply mixing the titanium tetrachloride into an inert organic solvent so as to produce a homogeneous solution containing at least 3 weight percent titanium tetrachloride. In most cases, such solutions of titanium tetrachloride will contain from 3 to 25 weight percent titanium tetrachloride, based upon the total weight of the solution. The mixture of the trialkylaluminum compound and the ether can be utilized as a solution or neat. The ratio of the ether to the trialkylaluminum compound will generally be from 0.4:1.0 to 1.2:1.0 with a ratio of 0.5:1.0 to 1.0:1.0 being preferred. Such solutions of the trialkylaluminum compound and the ether can be prepared by mixing from at least 3 weight percent of the trialkylaluminum compound and at least 1.5 weight percent of the ether into an inert organic solvent so as to produce a homogeneous solution. In most cases, the mixture of the trialkylaluminum compound and the ether will contain from 3 to 25 weight percent of the trialkylaluminum compound and from 1.5 to 13 weight percent of the ether. Both of these components can be added neat if a sufficient amount of an inert organic solvent is separately added to produce a solution containing 1 to 13 weight percent titanium tetrachloride, 1 to 13 weight percent trialkylaluminum compound and 0.7 to 8 weight percent of the ether.

The titanium tetrachloride and the mixture of the trialkylaluminum compound and the ether are added in amounts so that the mole ratio of the trialkylaluminum compound to titanium tetrachloride is between about 0.7:1.0 to 1.2:1.0. Preferably, the mole ratio of the trialkylaluminum compound to titanium tetrachloride will be between 0.8:1 and 1.1:1 with the most preferred mole ratio of the trialkylaluminum compound to titanium tetrachloride being between 0.85:1.0 and 0.95:1.0. The titanium tetrachloride and the solution of the trialkylaluminum compound and the ether are thoroughly mixed by applying some form of vigorous agitation. Normally, the agitation will be provided by rotating blades in the reaction zone.

The catalyst components are mixed and maintained at a temperature of from −20° C. to 60° C. It is generally preferred for the catalyst system to be preformed at a temperature of from −5° C. to 50° C.

The catalyst slurry formed is allowed to age for from 0.5 hours to 200 hours to form a preformed catalyst composition. It is normally preferred to age the preformed catalyst system for about 1 hour to about 24 hours. It is most preferred to age the catalyst system for 2 hours to 6 hours.

The preformed titanium catalyst system is recovered from the slurry of preformed catalyst before it is employed in carrying out the vapor phase polymerizations of this invention. This can be accomplished by simply allowing the solvent in the preformed catalyst system to evaporate so as to yield a powder of the preformed titanium catalyst system. This process can be facilitated by utilizing an elevated temperature and/or vacuum. It can also be facilitated by passing an inert gas through the catalyst suspension. In batch processes, the preformed catalyst solution can be charged into the reaction zone (reactor) with the solvent being removed before monomer introduction. In such a case, the dry catalyst system will normally adhere to the reactor walls. Optionally, the solvent in the preformed catalyst solution can be removed outside of the reaction zone to form a powder which can be continuously charged into the reaction zone in continuous processes.

It is normally preferred for the preformed titanium catalyst system to be supported. The support can be any solid material which is inert and which will not adversely affect the properties of the cis-1,4-polyisoprene rubber. Carbon black and silica are examples of materials which are highly preferred as supports. This is because carbon black and silica are commonly used as fillers in rubber compounds and their presence in the rubber being synthesized would not normally be deemed to be detrimental. In fact, the utilization of cis-1,4-polyisoprene rubber which already contains carbon black and/or silica would be deemed advantageous in many applications.

To reduce the level of gel formation, it is sometimes desirable to conduct the polymerization in the presence of a diarylamine, such as para-styrenated diphenylamine. Generally, the molar ratio of the diarylamine to titanium tetrachloride will be within the range of about 5:1 to about 0.05:1. The molar ratio of the diarylamine to titanium tetrachloride will more typically be within the range of about 2:1 to about 0.25:1. The molar ratio of the diarylamine to titanium tetrachloride will preferably typically be within the range of about 1.5:1 to about 0.5:1. The diarylamine will normally be mixed with the preformed titanium catalyst system prior to being supported. Thus, the diarylamine will also be supported with the catalyst system.

The diarylamines which can be utilized have the general structural formula:

wherein R represents a hydrogen atom, an aryl group, an alkyl group or an alkaryl group. Para-styrenated diphenylamines are highly preferred diarylamines.

Wingstay® 29 para-styrenated diphenylamine is sold commercially by The Goodyear Tire & Rubber Company and typically consists of several isomers including:
p,p'-distyryl diphenylamine
o,p,p'-tristyryl diphenylamine
o,p'-distyryl diphenylamine
p-styryl diphenylamine
o,o'-distyryl diphenylamine Para-styrenated diphenylamine, which is also known as p,p'-distyryl diphenylamine has the chemical structural formula:

Para-styrenated diphenylamine is also sold by Lowi under the tradename Lowinox SDA and by Mobay under the tradename Vulkanox DDA.

In the preparation of supported catalyst systems, it is normally desirable to passivate the material being employed as the support. This is generally accomplished by destroying active sites on the material by treatment with an organoaluminum compound. The organoaluminum compound will generally be the same organoaluminum compound that is employed in the preformed titanium catalyst system. The catalyst dispersion is added to the support to form a slurry. The solvent is then removed, such as by evaporation, to deposit the preformed catalyst on the support.

The Vapor Phase Polymerization of 1,3-Butadiene

Butadiene monomer can be polymerized to very high cis-1,4-polybutadiene (95 percent or more cis-1,4-isomeric butadiene units) in a continuous vapor phase polymerization process using a three-component nickel catalyst system. This three-component nickel catalyst system includes an organoaluminum compound, a soluble nickel containing compound and a hydrogen fluoride or a hydrogen fluoride complex.

In such vapor state polymerizations, the temperature in the reaction zone will normally be maintained within the range of about 10° C. to about 130° C. It is preferred to utilize a temperature in the reaction zone which is within the range of about 20° C. to about 100° C. The most preferred temperature for carrying out the gas phase polymerization of 1,3-butadiene monomer is about 35° C. to about 85° C.

The organoaluminum compound that can be utilized has the structural formula:

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum, diisobutyl aluminum hydride (DIBA-H) and diethyl aluminum fluoride.

The component of the catalyst which contains nickel can be any soluble organonickel compound. These soluble nickel compounds are normally compounds of nickel with mono-dentate or bi-dentate organic ligands containing up to 20 carbon atoms. A ligand is an ion or molecule bound to and considered bonded to a metal atom or ion. Mono-dentate means having one position through which covalent or coordinate bonds with the metal may be formed. Bi-dentate means having two positions through which covalent or coordinate bonds with the metal may be formed. The term "soluble" refers to solubility in butadiene monomer and inert solvents.

Generally, any nickel salt or nickel containing organic acid containing from about 1 to 20 carbon atoms may be employed as the soluble nickel containing compound. Some representative examples of soluble nickel containing compounds include nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis (cyclopentadiene) nickel, bis(salicylaldehyde) ethylene diimine nickel, cyclopentadienyl-nickel nitrosyl, bis(π-allyl nickel), bis(π cycloocta-1,5-diene) nickel, bis(π-allyl nickel trifluoroacetate) and nickel tetracarbonyl. The preferred component containing nickel is a nickel salt of a carboxylic acid or an organic complex compound of nickel. Nickel naphthenate, nickel octanoate and nickel neodecanoate are highly preferred soluble nickel containing compounds. Nickel 2-ethylhexanoate, which is commonly referred to as nickel octanoate (NiOct) is the soluble nickel containing compound which is most commonly used due to economic factors.

If hydrogen fluoride is utilized in the catalyst system, it should be anhydrous and as pure as possible.

The hydrogen fluoride can also be utilized as a complex in the catalyst systems of this invention. Hydrogen fluoride complexes can readily be made with compounds which contain an atom or radical which is capable of lending electrons to or sharing electrons with hydrogen fluoride. Compounds capable of such association are ethers, alcohols, ketones, esters, nitriles, water, and certain amines.

The ketone subclass can be defined by the formula wherein R' and R are selected from the group consisting of alkyl radicals, cycloalkyl radicals, aryl radicals, alkaryl radicals and arylalkyl radicals containing from 1 to about 30 carbon atoms; and wherein R' and R can be the same or different. These ketones represent a class of compounds which have a carbon atom attached by a double bond to oxygen. Some representative examples of ketones that are useful in the preparation of the ketone-hydrogen fluoride complexes of this invention include dimethyl ketone, methylethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred ketones that can be used to form the ketone-hydrogen fluoride compounds of this invention are the dialkyl ketones of which acetone is most preferred.

The nitrile subclass can be represented by the formula RCN where R represents alkyl groups, cycloalkyl groups, aryl groups, alkaryl groups or arylalkyl groups that contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile and the like. The preferred hydrogen fluoride-nitrile complex is the hydrogen fluoride benzonitrile complex.

The alcohol subclass can be defined by the formula ROH where R represents alkyl radicals, cycloalkyl radicals, aryl radicals, alkaryl radicals or arylalkyl radicals containing from about 1 to about 30 carbon atoms. These alcohols represent a class of compounds which have a carbon atom attached by a single bond to oxygen which is in turn attached to a hydrogen by a single bond. Representative but not exhaustive of the alcohols useful in the preparation of hydrogen fluoride complexes are methanol, ethanol, n-propanol, isopropanol, benzyl alcohol, cyclohexanol, butanol, hexanol and pentanol. The preferred hydrogen fluoride-alcohol complex is hydrogen fluoride phenolate complex.

The ether subclass can be defined by the formula R'OR where R and R' represent alkyl radicals, cycloalkyl radicals, aryl radicals, alkaryl radicals and arylalkyl radicals containing from about 1 to about 30 carbon atoms; wherein R and R' may be the same or dissimilar. The R may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes of this invention are dimethyl ether, diethyl ether, dibutyl ether, diamyl ether, diisopropyl ethers, tetrahydrofuran, anisole, diphenyl ether, ethyl methyl ether, dibenzyl ether and the like. The preferred hydrogen fluoride-ether complexes are hydrogen fluoride diethyl etherate and hydrogen fluoride dibutyl etherate complexes.

The ester subclass can be defined by the formula wherein R and R' are selected from the group consisting of alkyl radicals, cycloalkyl radicals, aryl radicals, alkaryl radicals and arylalkyl radicals containing from 1 to about 20 carbon atoms. The esters contain a carbon atom attached by a double bond to an oxygen atom as indicated. Representative but not exhaustive of such esters are ethyl benzoate, amyl benzoate, phenyl acetate, phenyl benzoate and other esters conforming to the formula above. The preferred hydrogen fluoride-ester complex is hydrogen fluoride ethyl benzoate complex.

The complexes of this invention are usually prepared by simply bubbling gaseous hydrogen fluoride into appropriate amounts of the complexing agent; for instance, a ketone, an ether, an ester, an alcohol or a nitrile. This should be done in the absence of moisture and measures should be taken to keep the temperature from rising above about 100° F. (37.7° C.). In most cases, hydrogen fluoride complexes are prepared with the temperature being maintained at room temperature. Another possible method would be to dissolve the hydrogen fluoride or the complexing agent in a suitable solvent followed by adding the other component. Still another method of mixing would be to dissolve the complexing agent in a solvent and simply bubble gaseous hydrogen fluoride through the system until all of the complexing agent is reacted with the hydrogen fluoride. The concentrations can be determined by weight gain or chemical titration.

The three component catalyst system utilized must be preformed. If the catalyst system is preformed, it will maintain a high level of activity over a long period of time. The utilization of such a preformed catalyst system also results in the formation of a uniform polymeric product. Such preformed catalyst systems are prepared in the presence of one or more preforming agents selected from the group consisting of monoolefins, nonconjugated diolefins, conjugated diolefins, cyclic nonconjugated multiolefins, triolefins, vinyl ethers, aromatic nitriles and polydiene polymers, such as polybutadiene.

Some representative examples of olefins that can be used as the preforming agent in the preparation of stabilized catalysts are trans-2-butene, mixed cis- and trans-2-pentene and cis-2-pentene. Some nonconjugated diolefins that can be used as preforming agents are cis-1,4-hexadiene, 1,5-heptadiene, 1,7-octadiene and the like. Representative examples of cyclic nonconjugated multiolefins that can be used include 1,5-cyclooctadiene, 1,5,9-cyclododecatriene and 4-vinyl cyclohexene-1. Triolefins that can be used as the preforming agent include 1,3,5-hexatriene, 1,3,5-heptatriene, 1,3,6-octatriene, 5-methyl-1,3,6-heptatriene and the like. Some representative examples of substituted conjugated diolefins that can be used include 1,4-diphenyl butadiene, myrcene (7-methyl-3-methylene-1,6-octadiene) and the like. Ethyl vinyl ether and isobutyl vinyl ether are representative examples of alkyl vinyl ethers that can be used as the preforming agent. A representative example of an aromatic nitrile that can be used is benzonitrile. Some representative examples of conjugated diolefins that can be used include 1,3-butadiene, isoprene and 1,3-pentadiene. The preferred preforming agent is 1,3-butadiene.

A method of preparing the preformed catalyst so that it will be highly active and relatively chemically stable is to add the organoaluminum compound and the preforming agent to the solvent medium before they come into contact with the nickel compound. The nickel compound is then added to the solution and then the fluoride compound is added to the solution. As an alternative, the preforming agent and the nickel compound may be mixed, followed by the addition of the organoaluminum compound and then the fluoride compound. Other orders of addition may be used but they generally produce less satisfactory results.

The amount of preforming agent used to preform the catalyst may be within the range of about 0.001 to 3 percent of the total amount of monomer to be polymerized. Expressed as a mole ratio of preforming agent to nickel compound, the amount of preforming agent present during the preforming step can be within the range of about 1 to 3000 times the concentration of nickel. The preferred mole ratio of preforming agent to nickel is about 3:1 to 500:1.

These preformed catalysts have catalytic activity immediately after being prepared. However, it has been observed that a short aging period (for example, 15 to 30 minutes) at a moderate temperature (for example, 50° C.) increases the activity of the preformed catalyst greatly. If convenient, the preformed catalyst can be aged for up to several days.

In order to properly stabilize the catalyst, the preforming agent must be present before the organoaluminum compound has an opportunity to react with either the nickel compound or the fluoride compound. If the catalyst system is preformed without the presence of at least a small amount of preforming agent, the chemical effect of the organoaluminum upon the nickel compound or the fluoride compound is such that the catalytic activity of the catalyst is greatly lessened and shortly thereafter rendered inactive. In the presence of at least a small amount of preforming agent, the catalytic or shelf life of the catalyst is greatly improved over the system without any preforming agent present.

The three component nickel catalyst systems utilized in the practice of the present invention have activity over a wide range of catalyst concentrations and catalyst component ratios. The three catalyst components interact to form the active catalyst system. As a result, the optimum concentration for any one component is very dependent upon the concentrations of each of the other two catalyst components.

Furthermore, while polymerization will occur over a wide range of catalyst concentrations and ratios, the most desirable properties for the polymer being synthesized are obtained over a relatively narrow range.

Vapor phase polymerizations can be carried out utilizing a mole ratio of the organoaluminum compound to the nickel containing compound within the range of from about 0.3:1 to about 300:1, with the mole ratio of the fluorine containing compound to the organonickel containing compound ranging from about 0.5:1 to about 200:1 and with the mole ratio of the fluorine containing compound to the organoaluminum compound ranging from about 0.4:1 to about 10:1. The preferred mole ratios of the organoaluminum compound to the nickel containing compound ranges from about 2:1 to about 80:1, the preferred mole ratio of the fluorine containing compound to the nickel containing compound ranges from about 50:1 to about 150:1 and the preferred mole ratio of the fluorine containing compound to the organoaluminum compound ranges from about 0.7:1 to about 7:1. The concentration of the catalyst system utilized in the reaction zone depends upon factors such as purity, the reaction rate desired, the polymerization temperature utilized, the reactor design and other factors.

The three component nickel catalyst system is recovered from the solution of preformed catalyst before it is employed in carrying out the vapor phase polymerizations of this invention. This can be accomplished by simply allowing the solvent in the preformed catalyst system to evaporate so as to yield a powder of the nickel catalyst system. This process can be facilitated by utilizing an elevated temperature and/or vacuum. It can also be facilitated by passing an inert gas through the catalyst suspension. In batch processes, the preformed catalyst solution can be charged into the reaction zone (reactor) with the solvent being removed before monomer introduction. In such a case, the dry catalyst system will normally adhere to the reactor walls. Optionally, the solvent in the preformed catalyst solution can be removed outside of the reaction zone to form a powder which can be continuously charged into the reaction zone in continuous processes.

It is normally preferred for the three component nickel catalyst system to be supported. The support can be any solid material which is inert and which will not adversely affect the properties of the cis-1,4-polybutadiene rubber. Carbon black and silica are examples of materials which are highly preferred as supports. This is because carbon black and silica are commonly used as fillers in rubber compounds and their presence in the rubber being synthesized would not normally be deemed to be detrimental. In fact, the utilization of cis-1,4-polybutadiene rubber which already contains carbon black and/or silica would be deemed advantageous in many applications.

In the preparation of supported catalyst systems, it is normally desirable to passivate the material being employed as the support. This is generally accomplished by destroying active sites on the material by treatment with an organoaluminum compound. The organoaluminum compound will generally be the same organoaluminum compound that is employed in the three-component nickel catalyst system. The catalyst dispersion is added to the support to form a slurry. The solvent is then removed, such as by evaporation, to deposit the preformed catalyst on the support.

One or more molecular weight regulators can be charged into the reaction zone. The molecular weight regulators which can be used include those which are known to be useful in solution polymerizations of 1,3-butadiene monomer which utilize nickel catalyst systems, such as those disclosed in U.S. Pat. No. 4,383,097 and South African Patents 83/2555, 83/2557 and 83/2559. These molecular weight regulators are selected from the group consisting of ethylene, $\alpha$-olefins, cis-2-butene, trans-2-butene, allene, 1,4-pentadiene, 1,5-hexadiene, 1,6-heptadiene, 1,2,4-trivinylcyclohexene, 1-trans-4-hexadiene and 4-vinyl-1-cyclohexene. The $\alpha$-olefins that can be utilized generally contain from 3 to about 10 carbon atoms. Some representative examples of olefins that can be utilized for this purpose include ethylene, propylene, 1-butene, 1-pentene and 1-hexene. Ethylene is a preferred molecular weight regulator. This is because it is effective as a molecular weight regulator at low concentrations and is not a poison to the polymerization catalyst even if its concentration increases markedly. It has also been found that diarylamines act as molecular weight regulators when used in the nickel catalyzed vapor phase polymerization of 1,3-butadiene monomer into cis-1,4 -polybutadiene rubber. The use of diarylamines, such as para-styrenated diphenylamine, as molecular weight regulators is highly preferred.

The amount of molecular weight regulator that needs to be employed varies with the type of molecular weight regulator being utilized, with the catalyst level, with the polymerization temperature and with the desired molecular weight of the polymer being synthesized. For instance, if a high molecular weight polymer is desired, then a relatively small amount of molecular weight regulator is required. On the other hand, in order to reduce molecular weights substantially, relatively larger amounts of the molecular weight regulator will be utilized. Extremely effective molecular weight regulators (for example, ethylene) can be used in lower concentrations and will nevertheless suppress molecular weights to the same degree as do more typical molecular weight regulators at higher concentrations. Generally, the molecular weight regulator will be utilized at a concentration ranging between about 0.005 phm (parts per 100 parts of monomer) and 20 phm. It will normally be preferred for the molecular weight regulator to be utilized at a concentration of 0.025 phm to 15 phm with the most preferred concentration being between 0.05 phm and 10 phm.

In continuous processes, the molecular weight regulator is continuously charged into the reaction zone at a rate sufficient to maintain the desired concentration of the molecular weight regulator in the reaction zone. Even though the molecular weight regulator is not consumed in the polymerization reaction, a certain amount of molecular weight regulator will normally need to be continuously added to compensate for losses. In continuous processes, the total quantity of the 1,3-butadiene monomer charged into the reaction zone per unit time is essentially the same as the quantity of high cis-1,4-polybutadiene withdrawn from the reaction zone within that unit of time.

Antioxidant Addition

The polymerizations of this invention can be carried out in the presence of diarylamine antioxidants and hindered phenol antioxidants. These specific types of antioxidants are not poisons to the nickel catalyst system used in making high cis-1,4-polybutadiene. Diarylamine antioxidants can be used with the titanium catalyst system used in making polyisoprene. The antioxidant can be premixed with the catalyst, it can be premixed with a partitioning agent, or it can be added to the reaction zone as a separate component. In other words, these antioxidants are either mixed with the catalyst before drying the catalyst to a powder, present when the catalyst is generated, or supported on a suitable partitioning agent, such as carbon black or silica. For example, the polymerization can be carried out by mixing the preformed catalyst dispersion with a solution of the antioxidant, drying the dispersion, and subsequently adding it to the reaction zone. The antioxidant solution could also be mixed with carbon black and then dried, resulting in the antioxidant being supported on the carbon black, which could be used as the catalyst support, or as a partitioning agent.

The diarylamine antioxidants which can be used in the vapor state polymerizations of this invention have previously been described. The hindered phenol antioxidants which can be employed are normally alkyl substituted phenols of the structural formula:

wherein $R^1$ and $R^2$ represent alkyl groups containing from 1 to about 10 carbon atoms and wherein $R^3$ represents a hydrogen atom or an alkyl group containing from 1 to about 10 carbon atoms. It is normally preferred for $R^1$ and $R^2$ to represent tetriary-alkyl groups containing from 4 to about 10 carbon atoms and for $R^3$ to represent a hydrogen atom or an alkyl group containing from 1 to about 6 carbon atoms.

Normally from about 0.25 phm to about 3 phm of the antioxidant will be added to provide the rubbery polymer with the desired degree of stability. It is generally preferred for about 0.5 phm to 2 phm of the antioxidant to be present during the polymerization. In most cases, it is more preferred for the antioxidant to be present at a level which is within the range of about 1 phm to about 1.5 phm.

This invention is illustrated by the following examples which is merely for the purpose of illustration and are not to be regarded as limiting the scope of the invention or the manner in which it can be practiced. Unless specifically indicated otherwise, parts and percentages are given by weight.

A polymer's molecular weight can be designated in terms of dilute solution viscosity (DSV), inherent viscosity, Mooney viscosity, number average molecular weight ($M_n$) and weight average molecular weight ($M_w$). In the following example, dilute solution viscosity was determined in a 0.25 weight percent toluene solution at 30° C.

EXAMPLE 1

In this experiment, neat isoprene was polymerized in a 4-ounce (118 ml) polymerization bottle by vapor phase polymerization. In the procedure used, a preformed titanium catalyst system was added to the polymerization bottle under a nitrogen atmosphere. A stream of dry nitrogen was passed through the bottle which removed the hexane solvent and left a dry catalyst deposit on the wall of the polymerization bottle. The bottle was then tared. Then, 20.0 g of isoprene was added to another polymerization bottle under a nitrogen atmosphere. The bottles were then placed in a constant temperature bath which was maintained at 50° C. A transfer needle (cannula) was used to connect the monomer and catalyst bottles. There was a slow deposition of polyisoprene on the wall of the catalyst containing bottle. The uptake of isoprene monomer was fairly slow. After 2 hours, the catalyst bottle contained 7.2 g of polyisoprene. Hexane was added to the bottle along with 1 phr of Wingstay K hindered phenolic antioxidant. Some of the polymer did not dissolve indicating that there was some gel formation. The material was dried in a vacuum oven overnight. DSC analysis showed a glass transition temperature of –66° C., which is typical for cis-1,4-polyisoprene.

EXAMPLE 2

In this experiment, the procedure utilized in Example 1 was repeated except that the polymerization was conducted in the presence of Wingstay® 29 para-styrenated diphenylamine and except that the polymerization time was only 45 minutes. The Wingstay 29 para-styrenated diphenylamine was added to the preformed titanium catalyst system at a molar ratio to the titanium tetrachloride of 1.4:1. It was added to the polymerization bottle at the same time as the titanium catalyst system.

A yield of 2.2 g of polyisoprene was recovered. The polyisoprene product was determined to be gel-free and it had a DSV of 2.8 dl/g. DSC analysis showed that the polyisoprene had a glass transition temperature of –66° C. Nuclear magnetic resonance $^{13}C$ analysis showed the microstructure to be 98 percent cis-1,4, 1 percent trans-1,4 and 1 percent 3,4 polyisoprene.

This experiment shows that gel-free polymer is produced when the polymerization is carried out in the presence of para-styrenated diphenylamine. It further shows that the titanium catalyst system produces cis-1,4-polyisoprene having a cis-1,4-isomer content of greater than 97 percent. Thus, the para-styrenated diphenylamine does not affect the microstructure of the cis-1,4-polyisoprene synthesized in its presence.

EXAMPLE 3

In this experiment, neat 1,3-butadiene was polymerized in a 4-ounce (118 ml) polymerization bottle by vapor phase polymerization. In the procedure used, a preformed catalyst system was made in a small bottle which was equipped with a magnetic stirring bar. First, about 35 ml of hexane was added. Then, under vigorous agitation, 3 ml of a 17 percent 1,3-butadiene in hexane solution was added. This was followed by the addition of 10 ml of a 0.87M triisobutyl aluminum solution. Then, 4.35 ml of a 0.05M nickel octanoate in hexane solution was added. Finally, 4.2 ml of a 5.2M hydrogen fluoride-dibutyl etherate solution was added.

The catalyst solution was aged for one day at room temperature and then 4.5 ml of the catalyst dispersion was added to the polymerization bottle under a nitrogen atmosphere. A stream of dry nitrogen was passed through the bottle which removed the hexane solvent and left a dry catalyst deposit on the wall of the polymerization bottle. The bottle was then tared so that an accurate yield could be determined. Then, 7.0 g of 1,3-butadiene was added to another polymerization bottle under a nitrogen atmosphere. A transfer needle (cannula) was used to connect the monomer and catalyst bottles, both of which were at ambient temperature. There was a slow deposition of polybutadiene on the wall of the catalyst containing bottle. The uptake of 1,3-butadiene monomer was fairly slow. After 2.25 hours, the catalyst bottle contained 2.0 g of polybutadiene. Hexane was added to the bottle along with 1 phr (part per 100 parts of rubber) of Wingstay K hindered phenolic antioxidant. All of the polymer dissolved indicating that there was no gel. The material was dried in a vacuum oven overnight and its DSV was determined to be 3.26 dl/g. DSC analysis showed a glass transition temperature of −108° C. and a melting point of −6.5° C. Both the glass transition temperature and the melting point measured are typical for high cis-1,4-polybutadiene.

EXAMPLES 4–9

In this series of experiments, 1,3-butadiene monomer was polymerized into high cis1,4-polybutadiene by a vapor phase polymerization technique. A preformed catalyst system was prepared by adding about 50 ml of dry hexane to a 4-ounce (118 ml) polymerization bottle under a nitrogen atmosphere followed by the addition of 3.4 ml of a 15 weight percent solution of 1,3-butadiene in hexane, and subsequently by the addition of 20.0 ml of a 0.86M solution of triisobutylaluminum. About 2 minutes after that, 8.6 ml of a 0.05M solution of nickel octoate was added with 4.1 ml of a 10.5M solution of hydrogen fluoride butyl etherate being added about 5 minutes later. By-product gas was vented off. The final volume of the catalyst solution was 83.3 ml. The catalyst solution had a nickel concentration of 0.0052M.

A similar catalyst solution make-up was done where 4.30 g of Wingstay® 29 para-styrenated diphenylamine antioxidant was added to the hexane solutions before the triisobutylaluminum was added. The final concentration of nickel in this case was 0.0049M.

Gas phase polymerizations were carried out in 4-ounce (118 ml) polymerization bottles. In this polymerization technique, carbon black and antioxidant solutions were added to the polymerization bottle under a nitrogen atmosphere. The hexane solvent from the antioxidant solutions was then removed by a nitrogen purge. The catalyst dispersion (or catalyst/antioxidant) in hexane was then added and the mixture was vigorously agitated. These catalysts contained 0.01 mM of nickel. Further nitrogen purging removed the remaining hexanes. This catalyst-containing bottle was then connected via a hypodermic needle to another 4-ounce (118 ml) polymerization bottle which contained 1,3-butadiene liquid. A vent needle was inserted into the catalyst-containing bottle, allowing the bottle to be purged with butadiene gas for about 2 minutes. The vent needle was then removed. The bottles were allowed to stand in the hood at room temperature for the desired reaction time. In Examples 4–7, a polymerization time of 2.5 hours was utilized and, in Examples 8 and 9, a reaction time of 1.5 hours was employed. The transfer needle was removed and the polymer yield was determined. In Examples 4–7, the antioxidant was added as a separate solution. In Examples 8–9, the antioxidant was present when the preformed catalyst was made up. The polymer yield realized in each of these experiments is shown in Table 1.

TABLE 1

| Example | Carbon Black | Antioxidant | Yield |
| --- | --- | --- | --- |
| 4 | — | — | 8.48 g |
| 5 | 3.0 g | — | 7.07 g |
| 6 | — | BHT[1], 0.10 | 8.60 g |
| 7 | 3.0 g | BHT[1], 0.10 | 7.52 g |
| 8 | — | Wingstay ® 29 | 5.96 g |
| 9 | 3.0 g | Wingstay ® 29 | 5.15 g |

[1]BHT stands for butylated hydroxytoluene.

This series of experiments shows that 1,3-butadiene monomer can be vapor state polymerized into high cis-1,4-polybutadiene rubber in presence of hindered phenol antioxidants or diarylamine antioxidants with the three component nickel catalyst system called for in the claims. Good yeilds can be attained in cases where the polymerization is carried out in the presence of the antioxidant. In fact, the BHT used in Examples 6 and 7 appears to have enhanced the polymer yield.

In the vapor phase polymerizations of this invention a major amount of the diene monomer being polymerized will typically be in the vapor state. Even though a suitable combination of temperature and pressure will be utilized in the reaction zone to maintained some of the diene monomer in the vapor state it is further contemplated that a portion of the diene monomer can simultaneously be in the liquid state. In other words, it is contemplated that a portion of the 1,3-butadiene monomer or isoprene monomer in the reaction zone can be in the liquid state. However, it is essential for a major amount of the monomer present in the reaction zone to be in the vapor phase.

Variations in the present invention are possible in light of the description provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for vapor phase polymerizing isoprene into cis-1,4-polyisoprene in a process comprising the steps of:

(1) charging into a reaction zone said isoprene and a preformed catalyst system which is made by reacting an organoaluminum compound with titanium tetrachloride in the presence of at least one ether; wherein the isoprene is maintained in the vapor phase in said reaction zone by a suitable combination of temperature and pressure and wherein the catalyst system is suspended on an inert solid support;

(2) allowing said isoprene to polymerize into cis-1,4-polyisoprene at a temperature within the range of about 35° C. to about 70° C.; and (3) withdrawing said cis-1,4-polyisoprene from said reaction zone.

2. A method for vapor phase polymerizing isoprene into cis-1,4-polyisoprene in a process comprising the steps of:

(1) charging into a reaction zone said isoprene and a preformed catalyst system which is made by reacting an organoaluminum compound with titanium tetrachloride in the presence of at least one ether; wherein the isoprene is maintained in the vapor phase in said reaction zone by a suitable combination of temperature and pressure and wherein said reaction zone is in a fluidized bed reactor;

(2) allowing said isoprene to polymerize into cis-1,4-polyisoprene at a temperature within the range of about 35° C. to about 70° C.; and (3) withdrawing said cis-1,4-polyisoprene from said reaction zone.

3. A method as specified in claim 1 wherein said organoaluminum compound has the structural formula wherein $R_1$ is selected from the group consisting of alkyl groups, aryl groups, alkaryl groups, arylalkyl groups and hydrogen; and wherein $R_2$ and $R_3$ can be the same or different and are selected from the group consisting of alkyl groups, aryl groups, alkaryl groups and arylalkyl groups.

4. A method as specified in claim 3 wherein said ether contains from about 4 to about 20 carbon atoms.

5. A method as specified in claim 4 wherein said organoaluminum compound is a trialkylaluminum compound.

6. A method for vapor phase polymerizing isoprene into cis-1,4-polyisoprene in a process comprising the steps of:

(1) charging into a reaction zone said isoprene and a preformed catalyst system which is made by reacting an organoaluminum compound with titanium tetrachloride in the presence of at least one ether; wherein the isoprene is maintained in the vapor phase in said reaction zone by a suitable combination of temperature and pressure, wherein said ether contains from about 4 to about 20 carbon atoms, wherein said organoaluminum compound is a trialkylaluminum compound, and wherein the polymerization is conducted in the presence of a para-styrenated diphenylamine;

(2) allowing said isoprene to polymerize into cis-1,4-polyisoprene at a temperature within the range of about 35° C. to about 70° C.; and (3) withdrawing said cis-1,4-polyisoprene from said reaction zone.

7. A method as specified in claim 6 wherein the molar ratio of the para-styrenated diphenylamine to the titanium tetrachloride is within the range of about 0.05:1 to 5:1.

8. A method as specified in claim 1 wherein said temperature is within the range of 40° C. to 60° C.

9. A method as specified in claim 6 wherein the molar ratio of the organoaluminum compound to the titanium tetrachloride is within the range of about 0.7:1 to about 1.2:1.

10. A method as specified in claim 9 further comprising devolatilizing said cis-1,4-polyisoprene after it has exited the reaction zone.

11. A method as specified in claim 10 wherein said reaction zone is maintained at a temperature within the range of about 40° C. to about 60° C.

12. A method for vapor phase polymerizing isoprene into cis-1,4-polyisoprene in a process comprising the steps of:

(1) charging into a reaction zone said isoprene and a preformed catalyst system which is made by reacting an organoaluminum compound with titanium tetrachloride in the presence of at least one ether; wherein the isoprene is maintained in the vapor phase in said reaction zone by a suitable combination of temperature and pressure and wherein the polymerization is conducted in the presence of a diarylamine;

(2) allowing said isoprene to polymerize into cis-1,4-polyisoprene at a temperature within the range of about 35° C. to about 70° C.; and (3) withdrawing said cis-1,4-polyisoprene from said reaction zone.

13. A method as specified in claim 1 which further comprises conducting the polymerization in the presence of a diarylamine.

14. A method as specified in claim 13 wherein the diarylamine is supported with the catalyst system on an inert solid support.

15. A method as specified in claim 14 wherein the molar ratio of the diarylamine to titanium in the catalyst system is within the range of about 0.05:1 to about 5:1.

16. A method as specified in claim 15 wherein the diarylamine is para-styrenated diphenylamine, and wherein the molar ratio of the para-styrenated diphenylamine to titanium in the catalyst system is within the range of about 0.25:1 to about 2:1.

17. A method as specified in claim 16 wherein the molar ratio of the para-styrenated diphenylamine to titanium in the catalyst system is within the range of about 0.5:1 to about 1.5:1.

18. A method as specified in claim 14 wherein the inert solid support is carbon black.

19. A method as specified in claim 16 wherein the molar ratio of the ether to the organoaluminum compound is within the range of about 0.4:1 to about 1.2:1, and wherein the molar ratio of the organoaluminum compound to the titanium tetrachloride is within the range of about 0.7:1 to about 1.2:1.

20. A method as specified in claim 17 wherein the molar ratio of the ether to the organoaluminum compound is within the range of about 0.5:1 to about 1:1, and wherein the molar ratio of the organoaluminum compound to the titanium tetrachloride is within the range of about 0.8:1 to about 1.1:1.

21. A method as specified in claim 20 wherein the molar ratio of the organoaluminum compound to the titanium tetrachloride is within the range of about 0.85:1 to about 0.95:1.

22. A method for vapor phase polymerizing 1,3-butadiene into high cis-1,4-polybutadiene in a process comprising the steps of:

(1) charging said 1,3-butadiene and a catalyst system comprising (a) an organoaluminum compound, (b) a soluble organonickel compound and (c) hydrogen fluoride or a hydrogen fluoride complex into a reaction zone; wherein the 1,3-butadiene is maintained in the vapor phase in said reaction zone by a suitable combination of temperature and pressure;

(2) allowing said 1,3-butadiene to polymerize into high cis-1,4-polybutadiene at a temperature within the age of 10° C. to 130° C.; and (3) withdrawing said high cis-1,4-polybutadiene from said reaction zone.

23. A method as specified in claim 22 wherein the catalyst system is suspended on an inert solid support.

24. A method as specified in claim 22 wherein said reaction zone is in a fluidized bed reactor.

25. A method as specified in claim 22 wherein said organoaluminum compound has the structural formula wherein $R_1$ is selected from the group consisting of alkyl groups, aryl groups, alkaryl groups, arylalkyl groups, alkoxy groups, hydrogen and fluorine; and wherein $R_2$ and $R_3$ can be the same or different and are selected from the group consisting of alkyl groups, aryl groups, alkaryl groups and arylalkyl groups.

26. A method as specified in claim 25 wherein said soluble organonickel compound is selected from the group consisting of nickel salts and nickel containing organic acids containing from 1 to about 20 carbon atoms.

27. A method as specified in claim 26 wherein said fluorine containing compound is a hydrogen fluoride complex.

28. A method as specified in claim 27 wherein a molecular weight regulator is present.

29. A method as specified in claim 28 wherein said molecular weight regulator is ethylene.

30. A method as specified in claim 27 wherein said temperature is within the range of 20° C. to 100° C.

31. A method as specified in claim 28 wherein said molecular weight regulator is ethylene or an α-olefin that contains from 3 to about 10 carbon atoms.

32. A method as specified in claim 31 wherein said α-olefin is present in said reaction zone at a concentration of 0.1 phm to 15 phm.

33. A method as specified in claim 24 wherein said organoaluminum compound is a trialkylaluminum, wherein said soluble organonickel compound is selected from the group consisting of nickel salts and nickel containing organic acids containing from 1 to about 20 carbon atoms and wherein said fluorine containing compound is a hydrogen fluoride complex.

34. A method as specified in claim 33 wherein the mole ratio of the organoaluminum compound to the soluble nickel containing compound is within the range of from about 0.3:1 to about 300:1; wherein the mole ratio of the fluorine containing compound to the soluble nickel containing compound is within the range of from about 0.5:1 to about 200:1; and wherein the mole ratio of the fluorine containing compound to the organoaluminum compound is within the range of from about 0.4:1 to about 10:1.

35. A method as specified in claim 34 wherein said organoaluminum compound is selected from the group consisting of triethylaluminum, tri-n-propylaluminum, triisobutylaluminum, trihexylaluminum, diisobutylaluminumhydride and diethylaluminum fluoride.

36. A method as specified in claim 35 wherein said soluble nickel containing compound is nickel octanoate.

37. A method as specified in claim 36 wherein the mole ratio of the organoaluminum compound to the soluble nickel containing compound is within the range of from about 2:1 to about 80:1; wherein the mole ratio of the fluorine containing compound to the soluble nickel containing compound is within the range of from about 50:1 to about 150:1; and wherein the mole ratio of the fluorine containing compound to the organoaluminum compound is within the range of from about 0.7:1 to about 7:1.

38. A method as specified in claim 37 further comprising devolatilizing said high cis-1,4-polybutadiene after it has exited the reaction zone.

39. A method as specified in claim 38 wherein said reaction zone is maintained at a temperature within the range of 35° C. to 85° C.

40. A method as specified in claim 23 wherein said organoaluminum compound has the structural formula wherein $R_1$ is selected from the group consisting of alkyl groups, aryl groups, alkaryl groups, arylalkyl groups, alkoxy groups, hydrogen and fluorine; and wherein $R_2$ and $R_3$ can be the same or different and are selected from the group consisting of alkyl groups, aryl groups, alkaryl groups and arylalkyl groups; wherein said soluble organonickel compound is selected from the group consisting of nickel salts and nickel containing organic acids containing from 1 to about 20 carbon atoms; and wherein said fluorine containing compound consists of hydrogen fluoride or a hydrogen fluoride complex.

41. A method as specified in claim 40 wherein the mole ratio of the organoaluminum compound to the soluble nickel containing compound is within the range of from about 0.3:1 to about 300:1; wherein the mole ratio of the fluorine containing compound to the soluble nickel containing compound is within the range of from about 0.5:1 to about 200:1; and wherein the mole ratio of the fluorine containing compound to the organoaluminum compound is within the range of from about 0.4:1 to about 10:1; and wherein said temperature is maintained within the range of 20° C. to 100° C.

42. A method as specified in claim 41 wherein the mole ratio of the organoaluminum compound to the soluble nickel containing compound is within the range of from about 2:1 to about 80:1; wherein the mole ratio of the fluorine containing compound to the soluble nickel containing compound is within the range of from about 3:1 to about 100:1; and wherein the mole ratio of the fluorine containing compound to the organoaluminum compound is within the range of from about 0.7:1 to about 7:1; wherein said organoaluminum compound is selected from the group consisting of triethylaluminum, tri-n-propylaluminum, triisobutylaluminum, trihexylaluminum, diisobutylaluminum hydride and diethylaluminum fluoride; and wherein said soluble nickel containing compound is selected from the group consisting of nickel naphthenate, nickel octanoate and nickel neodecanoate.

43. A method as specified in claim 22 which further comprises conducting the polymerization in the presence of a hindered phenol antioxidant.

44. A method as specified in claim 43 wherein the hindered phenol antioxidant has the structural formula:

wherein $R^1$ and $R^2$ represent alkyl groups containing from 1 to about 10 carbon atoms and wherein $R^3$ represents a hydrogen atom or an alkyl group containing from 1 to about 10 carbon atoms.

45. A method as specified in claim 44 wherein $R^1$ and $R^2$ represent tertiary-alkyl groups containing from 4 to about 10 carbon atoms and wherein $R^3$ represents a hydrogen atom or an alkyl group containing from 1 to about 6 carbon atoms.

46. A method as specified in claim 44 wherein the hindered phenol antioxidant is supported on a partitioning agent.

47. A method as specified in claim 46 wherein the partitioning agent is silica.

48. A method as specified in claim 46 wherein the partitioning agent is carbon black.

49. A method as specified in claim 43 wherein the hindered phenol antioxidant is present in an amount which is within the range of about 0.25 phm to about 3 phm.

50. A method as specified in claim 44 wherein the hindered phenol antioxidant is present in an amount which is within the range of about 0.5 phm to about 2 phm.

51. A method as specified in claim 46 wherein the hindered phenol antioxidant is present in an amount which is within the range of about 1 phm to about 1.5 phm.

52. A method as specified in claim 22 wherein a portion of the 1,3-butadiene monomer in the reaction zone is in the liquid state.

53. A method for vapor phase polymerizing isoprene into cis-1,4-polyisoprene in a process comprising the steps of:

(1) charging into a reaction zone said isoprene and a preformed catalyst system which is made by reacting an organoaluminum compound with titanium tetrachloride in the presence of at least one ether; wherein the isoprene is maintained in the vapor phase in said reaction zone by a suitable combination of temperature and pressure and wherein said reaction zone is in a stirred bed reactor;

(2) allowing said isoprene to polymerize into cis-1,4-polyisoprene at a temperature within the range of about 35° C. to about 70° C.; and (3) withdrawing said cis-1,4-polyisoprene from said reaction zone.

54. A method as specified in claim 2 wherein the molar ratio of the organoaluminum compound to the titanium tetrachloride is within the range of about 0.7:1 to about 1.2:1.

55. A method as specified in claim 2 further comprising devolatilizing said high cis-1,4-polyisoprene after it has exited the reaction zone.

56. A method as specified in claim 54 wherein the polymerization is conducted in the presence of at least one diarylamine.

57. A method as specified in claim 56 wherein the diarylamine is supported with the catalyst system on an inert solid support.

58. A method as specified in claim 57 wherein the molar ratio of the diarylamine to titanium in the catalyst system is within the range of about 0.05:1 to about 5:1.

59. A method as specified in claim 58 wherein the diarylamine is para-styrenated diphenylamine, and wherein the molar ratio of the para-styrenated diphenylamine to titanium in the catalyst system is within the range of about 0.25:1 to about 2:1.

60. A method as specified in claim 59 whereto the molar ratio of the para-styrenated diphenylamine to titanium in the catalyst system is within the range of about 0.5:1 to about 1.5:1.

61. A method as specified in claim 60 wherein the inert solid support is carbon black.

62. A method as specified in claim 61 wherein the molar ratio of the ether to the organoaluminum compound is within the range of about 0.4:1 to about 1.2:1, and wherein the molar ratio of the organoaluminum compound to the titanium tetrachloride is within the range of about 0.7:1 to about 1.2:1.

63. A method as specified in claim 62 wherein the molar ratio of the ether to the organoaluminum compound is within the range of about 0.5:1 to about 1:1, and wherein the molar ratio of the organoaluminum compound to the titanium tetrachloride is within the range of about 0.8:1 to about 1.1:1.

64. A method as specified in claim 63 wherein the molar ratio of the organoaluminum compound to the titanium tetrachloride is within the range of about 0.85:1 to about 0.95:1.

65. A method as specified in claim 53 wherein the molar ratio of the organoaluminum compound to the titanium tetrachloride is within the range of about 0.7:1 to about 1.2:1.

66. A method as specified in claim 53 further comprising devolatilizing said high cis-1,4-polyisoprene after it has exited the reaction zone.

67. A method as specified in claim 65 wherein the polymerization is conducted in the presence of at least one diarylamine.

68. A method as specified in claim 67 wherein the diarylamine is supported with the catalyst system on an inert solid support.

69. A method as specified in claim 68 wherein the molar ratio of the diarylamine to titanium in the catalyst system is within the range of about 0.05:1 to about 5:1.

70. A method as specified in claim 68 wherein the diarylamine is para-styrenated diphenylamine, and wherein the molar ratio of the para-styrenated diphenylamine to titanium in the catalyst system is within the range of about 0.25:1 to about 2:1.

71. A method as specified in claim 70 wherein the molar ratio of the para-styrenated diphenylamine to titanium in the catalyst system is within the range of about 0.5:1 to about 1.5:1.

72. A method as specified in claim 71 wherein the inert solid support is carbon black.

73. A method as specified in claim 72 wherein the molar ratio of the ether to the organoaluminum compound is within the range of about 0.4:1 to about 1.2:1, and wherein the molar ratio of the organoaluminum compound to the titanium tetrachloride is within the range of about 0.7:1 to about 1.2:1.

74. A method as specified in claim 73 wherein the molar ratio of the ether to the organoaluminum compound is within the range of about 0.5:1 to about 1:1, and wherein the molar ratio of the organoaluminum compound to the titanium tetrachloride is within the range of about 0.8:1 to about 1.1:1.

75. A method as specified in claim 74 wherein the molar ratio of the organoaluminum compound to the titanium tetrachloride is within the range of about 0.85:1 to about 0.95:1.

76. A method as specified in claim 12 wherein said temperature is within the range of about 40° C. to about 60° C.

77. A method as specified in claim 12 further comprising devolatilizing said high cis-1,4-polyisoprene after it has exited the reaction zone.

78. A method as specified in claim 12 wherein the molar ratio of the diarylamine to the titanium tetrachloride is within the range of about 0.05:1 to 5:1.

79. A method as specified in claim 78 wherein the molar ratio of the organoaluminum compound to the titanium tetrachloride is within the range of about 0.7:1 to about 1.2:1.

* * * * *